United States Patent
Katsu et al.

(10) Patent No.: US 8,728,344 B2
(45) Date of Patent: May 20, 2014

(54) ELECTRODE ACTIVE MATERIAL AND NONAQUEOUS ELECTROLYTE SECONDARY BATTERY HAVING THE SAME

(71) Applicants: Yayoi Katsu, Nagaokakyo (JP); Takashi Takagi, Nagaokakyo (JP)

(72) Inventors: Yayoi Katsu, Nagaokakyo (JP); Takashi Takagi, Nagaokakyo (JP)

(73) Assignee: Murata Manufacturing Co., Ltd., Nagaokakyo-shi, Kyoto-fu (JP)

(*) Notice: Subject to any disclaimer, the term of this patent is extended or adjusted under 35 U.S.C. 154(b) by 37 days.

(21) Appl. No.: 13/762,730

(22) Filed: Feb. 8, 2013

(65) Prior Publication Data

US 2013/0146807 A1    Jun. 13, 2013

Related U.S. Application Data

(63) Continuation of application No. PCT/JP2011/067203, filed on Jul. 28, 2011.

(30) Foreign Application Priority Data

Aug. 9, 2010    (JP) .................................. 2010-178502

(51) Int. Cl.
  *H01M 4/131*    (2010.01)
(52) U.S. Cl.
  USPC ...................................................... 252/182.1
(58) Field of Classification Search
  USPC ...................................................... 252/182.1
  See application file for complete search history.

(56) References Cited

U.S. PATENT DOCUMENTS

| 7,393,476 B2 * | 7/2008 | Shiozaki et al. ............ 252/521.2 |
| 2010/0104944 A1 * | 4/2010 | Saito et al. ..................... 429/223 |
| 2010/0209771 A1 * | 8/2010 | Shizuka et al. ............... 429/207 |
| 2012/0175552 A1 * | 7/2012 | Fukuchi et al. ............. 252/182.1 |

FOREIGN PATENT DOCUMENTS

| JP | 5-290845 A | 11/1993 | |
| JP | 2000-243394 A | 9/2000 | |
| JP | 2003-031219 A | 1/2003 | |
| JP | 2003-151548 A | 5/2003 | |
| JP | 2003-238165 A | 8/2003 | |
| JP | 2008-305777 A | 12/2008 | |
| WO | WO-02-073718 A1 | 9/2002 | |
| WO | WO 02073718 * | 9/2002 | ............ H01M 4/505 |
| WO | WO-02-086993 A1 | 10/2002 | |
| WO | WO-03-044881 A1 | 5/2003 | |
| WO | WO 2004082046 A1 * | 9/2004 | ............. H01M 4/02 |
| WO | WO-2008-126370 A1 | 10/2008 | |
| WO | WO-2010-074314 A1 | 7/2010 | |

OTHER PUBLICATIONS

PCT/JP2011/067203 Written Opinion dated Oct. 19, 2011.

* cited by examiner

*Primary Examiner* — Mark Eashoo
*Assistant Examiner* — M. Reza Asdjodi
(74) *Attorney, Agent, or Firm* — Dickstein Shapiro LLP

(57) ABSTRACT

An electrode active material that contains a lithium-nickel-manganese-cobalt composite oxide having a hexagonal, layered rock-salt type crystal structure that belongs to the space group R3m. The lithium-nickel-manganese-cobalt composite oxide is represented by the general formula $Li_{1+\alpha}[Ni_xMn_yCo_z]O_2$ (wherein $\alpha$ satisfies $0.1<\alpha<0.3$, and x, y, and z satisfy $x+y+z=1$, $0.075<z<0.250$, and $0.50<x/y<0.90$). In the powder X-ray diffraction analysis of a powder of the lithium-nickel-manganese-cobalt composite oxide using a CuKα ray, the peak intensity ratio (A/B) of the diffraction peak intensity (A) observed near $2\theta=18.6\pm0.2°$ to the diffraction peak intensity (B) observed near $2\theta=44.3\pm1.0°$ is more than 0 and less than 1.0.

5 Claims, No Drawings

ELECTRODE ACTIVE MATERIAL AND NONAQUEOUS ELECTROLYTE SECONDARY BATTERY HAVING THE SAME

CROSS REFERENCE TO RELATED APPLICATIONS

The present application is a continuation of International application No. PCT/JP2011/067203, filed Jul. 28, 2011, which claims priority to Japanese Patent Application No. 2010-178502, filed Aug. 9, 2010, the entire contents of each of which are incorporated herein by reference.

FIELD OF THE INVENTION

The present invention generally relates to an electrode active material and a nonaqueous electrolyte secondary battery having the same. Specifically, the present invention relates to an electrode active material containing a lithium-nickel-manganese-cobalt composite oxide having a hexagonal, layered rock-salt type crystal structure that belongs to the space group R3m, and also to a nonaqueous electrolyte secondary battery having the same.

BACKGROUND OF THE INVENTION

With the expansion of the market in portable electronic devices such as mobile phones, laptop computers, and digital cameras, as a cordless power supply for these electronic devices, high energy density, long-lasting secondary batteries have been awaited. Then, in order to meet such demands, secondary batteries using lithium ions or other alkali metal ions as charged carriers, in which the electrochemical reaction accompanying the transfer of charge is utilized, have been developed. Among them, high energy density lithium ion secondary batteries have spread widely.

In such a lithium ion secondary battery, as an electrode material (mainly as a positive electrode active material), cobalt composite oxides having a layered rock-salt type crystal structure, such as lithium cobalt oxide, have been used. However, cobalt composite oxides have problems on the safety and are high-cost. Meanwhile, nickel composite oxides having the same structure as cobalt composite oxides, such as lithium nickel oxide, are safer than cobalt composite oxides and low-cost. However, they are difficult to synthesize and also need attention during storage. In addition, the crystal structure of nickel composite oxides is unstable. Therefore, when used as an electrode material for a battery, there are problems with safety.

In order to solve such problems, in recent years, researches have been actively conducted on the use of, as an electrode material, a lithium-nickel-manganese-cobalt composite oxide having the same structure as cobalt composite oxides and nickel composite oxides.

For example, JP-A-2003-238165 (hereinafter referred to as Patent Document 1) and JP-A-2003-31219 (hereinafter referred to as Patent Document 2) disclose an example in which a lithium-nickel-manganese-cobalt composite oxide is used as a positive electrode active material in a nonaqueous electrolyte secondary battery.

Incidentally, currently, lithium ion secondary batteries have been mounted on hybrid electric vehicles (HEV), electric cars (EV), and the like, and they have a wider range of applications. Accordingly, lithium ion secondary batteries are used in a wider variety of environments, and the maintenance of battery performance in high-temperature environments or low-temperature environments has also been one of important issues.

Patent Document 1: JP-A-2003-238165
Patent Document 2: JP-A-2003-31219

SUMMARY OF THE INVENTION

However, there are problems in that even when the lithium-nickel-manganese-cobalt composite oxide disclosed in Patent Document 1 or Patent Document 2 is used as a positive electrode active material in a nonaqueous electrolyte secondary battery, rate characteristics in a low-temperature environment are not sufficient.

Thus, an object of the present invention is to provide an electrode active material capable of improving rate characteristics in a low-temperature environment and a nonaqueous electrolyte secondary battery having the same.

The electrode active material according to the present invention is an electrode active material containing a lithium-nickel-manganese-cobalt composite oxide having a hexagonal, layered rock-salt type crystal structure that belongs to the space group R3m. The lithium-nickel-manganese-cobalt composite oxide is represented by the general formula $Li_{1-\alpha}[Ni_xMn_yCo_z]O_2$ (wherein $\alpha$ satisfies $0.1<\alpha<0.3$, and x, y, and z satisfy $x+y+z=1$, $0.075<z<0.250$, and $0.50<x/y<0.90$). In the powder X-ray diffraction analysis of a powder of the lithium-nickel-manganese-cobalt composite oxide using a CuKα ray, the peak intensity ratio (A/B) of the diffraction peak intensity (A) observed near $2\theta=18.6\pm0.2°$ to the diffraction peak intensity (B) observed near $2\theta=44.3\pm1.0°$ is more than 0 and less than 1.0.

It is preferable that the electrode active material of the present invention contains tungsten, and that the molar ratio of tungsten content to the total content of nickel, manganese, and cobalt is 0.005 or more and 0.03 or less.

The nonaqueous electrolyte secondary battery of the present invention includes an electrode containing the above electrode active material.

According to the present invention, an electrode active material capable of improving rate characteristics in a low-temperature environment can be obtained.

DESCRIPTION OF THE PREFERRED EMBODIMENTS OF THE INVENTION

The electrode active material of the present invention is an electrode active material containing a lithium-nickel-manganese-cobalt composite oxide having a hexagonal, layered rock-salt type crystal structure that belongs to the space group R3m. The lithium-nickel-manganese-cobalt composite oxide is represented by the general formula $Li_{1-\alpha}[Ni_xMn_yCo_z]O_2$ (wherein $\alpha$ satisfies $0.1<\alpha<0.3$, and x, y, and z satisfy $x+y+z=1$, $0.075<z<0.250$, and $0.50<x/y<0.90$). In the powder X-ray diffraction analysis of a powder of the lithium-nickel-manganese-cobalt composite oxide using a CuKα ray, the peak intensity ratio (A/B) of the diffraction peak intensity (A) observed near $2\theta=18.6\pm0.2°$ to the diffraction peak intensity (B) observed near $2\theta=44.3\pm1.0°$ is more than 0 and less than 1.0.

The reason why the use of the electrode active material of the present invention in a nonaqueous electrolyte secondary battery leads to improved rate characteristics in a low-temperature environment is not clear. However, it appears that when the peak intensity ratio (A/B) is more than 0 and less than 1.0, the crystal structure of the lithium-nickel-manganese-cobalt composite oxide is unlikely to change during charging and discharging, making it possible to achieve a crystal structure that is not easily broken down. In addition, it appears that when the value of α in the general formula is within a range of $0.1 < \alpha < 0.3$, the Li element is not substituted with another transition metal element (Ni, Mn, and Co) but is likely to be present in a fixed site, making it possible to suppress an increase in resistance. Further, it appears that when the ratio (x/y) of the molar ratio of Ni element content (x) to the molar ratio of Mn element content (y) is within a range of $0.5 < x/y < 0.9$ to increase the content of the highly reactive Mn element, a lithium-nickel-manganese-cobalt composite oxide having a more stable crystal structure can be synthesized. In the case where x/y is 0.9 or more, the substitution between Li and Ni is likely to take place, resulting in an increase in internal resistance. In addition, in the case where x/y is 0.5 or less, a heterogeneous phase is likely to be produced, resulting in an increase in internal resistance. Further, in addition, it appears that when the molar ratio of Co element (z) is $0.075 < z < 0.250$, and the ratio (x/y) of the molar ratio of Ni element content (x) to the molar ratio of Mn element content (y) is $0.50 < x/y < 0.90$, grain growth tends to be suppressed, resulting in an increase in the contact area with an electrolyte solution, which possibly reduces diffusion resistance. It appears that for the above reasons, rate characteristics in a low-temperature environment are improved when an electrode active material containing a lithium-nickel-manganese-cobalt composite oxide having the limited composition and characteristics mentioned above is used in a nonaqueous electrolyte secondary battery.

It is preferable that the electrode active material of the present invention contains tungsten. In this case, it is preferable that the molar ratio of tungsten content to the total content of nickel, manganese, and cobalt is 0.005 or more and 0.03 or less. That is, it is preferable that the ratio $(\gamma/(x+y+z))$ of the molar ratio of tungsten content (γ) to the molar ratio of the total content of nickel, manganese, and cobalt (x+y+z) is $0.005 \leq \gamma/(x+y+z) \leq 0.03$. In the case where the value of the above ratio $(\gamma/(x+y+z))$ is within the range of 0.005 or more and 0.03 or less, rate characteristics in a low-temperature environment can be further improved.

A method for producing the electrode active material of the present invention includes at least a mixing step of mixing a lithium-containing raw material, a nickel-containing raw material, a manganese-containing raw material, and a cobalt-containing raw material to give a mixture and a firing step of firing the above mixture.

As an embodiment of the present invention, examples of lithium-containing raw materials include lithium oxide, carbonate, inorganic acid salts, organic acid salts, and chloride, etc. Specifically, it is preferable to use at least one member selected from lithium carbonate and lithium hydroxide as a lithium-containing raw material.

Examples of nickel-containing raw materials include nickel oxide, carbonate, inorganic acid salts, organic acid salts, and chloride, etc. Specifically, it is preferable to use at least one member selected from metallic nickel, nickel oxide, and nickel hydroxide as a nickel-containing raw material.

Examples of manganese-containing raw materials include manganese oxide, carbonate, inorganic acid salts, organic acid salts, and chloride, etc. Specifically, it is preferable to use at least one member selected from manganese dioxide, trimanganese tetraoxide, and manganese carbonate as a manganese-containing raw material.

Examples of cobalt-containing raw materials include cobalt oxide, carbonate, inorganic acid salts, organic acid salts, and chloride, etc. Specifically, it is preferable to use at least one member selected from cobalt hydroxide and tricobalt tetraoxide as a cobalt-containing raw material.

The mixing method and mixing conditions in the above mixing step and the firing method and firing conditions in the above firing step can be arbitrarily determined considering the required characteristics of a nonaqueous electrolyte secondary battery, productivity, etc. For example, it is preferable that in the production of an electrode active material, a lithium-containing raw material and a transition metal-containing raw material are mixed and dispersed in a solvent such as water, and the resulting slurry is spray-dried and then fired.

Next, an example of a method for producing a nonaqueous electrolyte secondary battery in the case where the electrode active material of the present invention is used as a positive electrode active material will be described in detail hereinafter.

First, a positive electrode is formed. For example, the positive electrode active material is mixed with a conductive agent and a binder, then one of an organic solvent and water is added to give a negative electrode active material slurry, and the positive electrode active material slurry is applied onto an electrode current collector by an arbitrary coating method and dried to form a positive electrode.

Next, a negative electrode is formed. For example, a negative electrode active material is mixed with a conductive agent and a binder, then one of an organic solvent and water is added to give a negative electrode active material slurry, and the negative electrode active material slurry is applied onto an electrode current collector by an arbitrary coating method and dried to form a negative electrode.

In the present invention, the negative electrode active material is not particularly limited, and it is possible to use a carbon material such as spheroidal graphite or a lithium-titanium composite oxide such as lithium titanate ($Li_4Ti_5O_{12}$) having a spinel-type structure. Even when a lithium-titanium composite oxide having a high reference potential is used as a negative electrode active material, the effects of the present invention mentioned above can be obtained.

In the invention, the binder is not particularly limited, and it is possible to use any of various resins such as polyethylene, polyvinylidene fluoride, polyhexafluoropropylene, polytetrafluoroethylene, polyethylene oxide, and carboxymethylcellulose.

In addition, the organic solvent is not particularly limited either. For example, it is possible to use a basic solvent such as dimethyl sulfoxide, dimethylformamide, N-methylpyrrolidone, propylene carbonate, diethyl carbonate, dimethyl carbonate, or γ-butyrolactone; a nonaqueous solvent such as acetonitrile, tetrahydrofuran, nitrobenzene, or acetone; or a protic solvent such as methanol or ethanol. In addition, the kind of organic solvent, the proportion of an organic compound to the organic solvent, the kind of additive and the amount added, and the like may be arbitrarily determined considering the required characteristics of a secondary battery, productivity, etc.

Next, the positive electrode and negative electrode obtained above are laminated with a separator therebetween, placed in a case containing an electrolyte in its interior space, and hermetically sealed. A nonaqueous electrolyte secondary battery is thus produced.

Incidentally, the electrolyte is present between the positive electrode and the negative electrode, which is a counter electrode, and transfers charged carriers between the two electrodes. As such an electrolyte, one having an ionic conductivity of $10^{-5}$ to $10^{-1}$ S/cm at room temperature may be used. For example, an electrolyte solution obtained by dissolving an electrolyte salt in an organic solvent may be used. Here, examples of usable electrolyte salts include $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

Examples of usable organic solvents include ethylene carbonate, propylene carbonate, dimethyl carbonate, diethyl carbonate, methylethyl carbonate, γ-butyrolactone, tetrahydrofuran, dioxolane, sulfolane, dimethylformamide, dimethylacetamide, and N-methyl-2-pyrrolidone.

In addition, the electrolyte used may also be a solid electrolyte. Examples of polymer compounds for use as solid electrolytes include vinylidene fluoride polymers such as polyvinylidene fluoride, vinylidene fluoride-hexafluoropropylene copolymers, vinylidene fluoride-ethylene copolymers, vinylidene fluoride-monofluoroethylene copolymers, vinylidene fluoride-trifluoroethylene copolymers, vinylidene fluoride-tetrafluoroethylene copolymers, and vinylidene fluoride-hexafluoropropylene-tetrafluoroethylene ternary copolymers; and acrylonitrile polymers such as acrylonitrile-methyl methacrylate copolymers, acrylonitrile-methyl acrylate copolymers, acrylonitrile-ethyl methacrylate copolymers, acrylonitrile-ethyl acrylate copolymers, acrylonitrile-methacrylate copolymers, acrylonitrile-acrylate copolymers, and acrylonitrile-vinyl acetate copolymers. Examples further include polyethylene oxide, ethylene oxide-propylene oxide copolymers, and polymers of these acrylate compounds and methacrylate compounds. In addition, a gel made of such a polymer compound impregnated with an electrolyte solution may also be used as an electrolyte. Alternatively, a polymer compound containing an electrolyte salt may also be directly used as an electrolyte. Incidentally, the electrolyte used may also be an inorganic solid electrolyte, including sulfide glass such as $Li_2S$—$P_2S_5$, $Li_2S$—$B_2S_3$, or $Li_2S$—$SiS_2$ glass, an oxide having a perovskite structure, an oxide having a NASICON structure, etc.

In the above embodiment, needless to say, the battery shape is not particularly limited. The embodiment is applicable to cylindrical, square, and sheet-like shapes, etc. In addition, the method for forming an outer casing is not particularly limited either, and it is possible to use a metal case, a molded resin, an aluminum laminate film, or the like.

In addition, although the electrode active material of the present invention is used for a positive electrode in the above embodiment, it may also be applied to a negative electrode.

Further, although the electrode active material is used in a nonaqueous electrolyte secondary battery in the above embodiment, it may also be used in a primary battery.

Next, examples of the present invention will be specifically described. Incidentally, the following examples are intended to be illustrative, and the present invention is not limited to the following examples.

EXAMPLES

As electrode active materials of the present invention, lithium-nickel-manganese-cobalt composite oxides having a hexagonal, layered rock-salt type crystal structure that belongs to the space group R3m and represented by the general formula $Li_{1+\alpha}[Ni_xMn_yCo_z]O_2$ (wherein α satisfies $0.1<\alpha<0.3$, and x, y, and z satisfy $x+y+z=1$, $0.075<z<0.25$, $0.5<x/y<0.9$) were produced. The following will describe Examples 1 to 3 of nonaqueous electrolyte secondary batteries using the electrode active materials, as well as Comparative Examples 1 to 6.

Example 1

Production of Lithium-Nickel-Manganese-Cobalt Composite Oxide

A metallic nickel powder as a nickel-containing raw material, trimanganese tetraoxide ($Mn_3O_4$) as a manganese-containing raw material, tricobalt tetraoxide ($Co_3O_4$) as a cobalt-containing raw material, and lithium carbonate ($Li_2CO_3$) as a lithium-containing raw material were prepared. These raw materials were weighed to the following molar ratio: Li/(Ni+Mn+Co)=1.15, Nn:Mn:Co=0.35:0.45:0.20. The weighed raw materials were mixed in a ball mill using water as a solvent to give a slurry. The obtained slurry was spray-dried to give a dry powder. The obtained dry powder was fired in an oxygen gas atmosphere at a temperature of 950° C. for 20 hours, thereby giving $Li_{1+0.15}[Ni_{0.35}Mn_{0.45}Co_{0.20}]O_2$ as a lithium-nickel-manganese-cobalt acid composite oxide.

(Production of Positive Electrode)

The lithium-nickel-manganese-cobalt composite oxide produced above as a positive electrode active material, a carbon material as a conductive agent, and polyvinylidene fluoride (PVDF (Polyvinylidine DiFuoride)) as a binder were weighed to a weight ratio of 88:6:6 and mixed to give a positive electrode mixture. The positive electrode mixture was dispersed in N-methyl-2-pyrrolidone as a solvent and kneaded to give a positive electrode slurry. The produced positive electrode slurry was applied to both sides of a 20 μm-thick aluminum foil such that the thickness as a current collector on each side was 6.6 mg/cm². The slurry was dried at a temperature of 130° C. and then rolled using a roll press to give a positive electrode sheet.

(Production of Negative Electrode)

Spheroidal graphite as a negative electrode active material and PVDF as a binder were weighed to a weight ratio of 93:7 and mixed to give a negative electrode mixture. The negative electrode mixture was dispersed in N-methyl-2-pyrrolidone as a solvent and kneaded to give a negative electrode slurry. The produced negative electrode slurry was applied to both sides of a 10 μm-thick copper foil such that the thickness as a current collector on each side was 3.2 mg/cm². The slurry was dried at a temperature of 140° C. and then pressed under a pressure of 1 ton/cm² to give a negative electrode sheet.

(Production and Evaluation of Battery)

The positive electrode sheet and negative electrode sheet produced above were laminated with a polyethylene porous membrane therebetween as a separator, while as an electrolyte solution, lithium hexafluorophosphate ($LiPF_6$) was mixed with a solvent obtained by mixing ethylene carbonate and diethyl carbonate in a volume ratio of 3:7 in an amount of 1 mol per 1 L of the solvent. The resulting laminate and mixture were placed in a case made of an aluminum laminate film and hermetically sealed to give a laminate-type battery.

Discharge characteristics in a low-temperature environment were evaluated using the laminate-type battery produced above. First, the battery was charged to 4.2 V at a current of 75 mA and then maintained at a voltage of 4.2 V for 5 hours. Subsequently, the aluminum laminate film case of the laminate-type battery was partially cut to remove the gas produced therein. Subsequently, the laminate-type battery from which gas had been removed was hermetically sealed again, and repeatedly charged and discharged three times at a current of 75 mA within a voltage range of 2.5 to 4.2 V. From the discharge capacity in the third cycle, currents at 1 C and 10 C (1 C: 250 mA, 10 C: 25 A) were each calculated, and a discharge test was carried out at each current in a low-temperature environment at a temperature of −30° C.

Incidentally, here, as mentioned above, 1.0 C is the current at which charging or discharging completes in 1 hour, and 10 C is the current at which charging or discharging completes in 6 minutes.

Example 2

A lithium-nickel-manganese-cobalt composite oxide was produced by the same method as in Example 1. However, the raw materials were weighed to the following molar ratio: Li/(Ni+Mn+Co)=1.15, Ni:Mn:Co=0.425:0.475:0.10.

A laminate-type battery was produced by the same method as in Example 1 using the obtained lithium-nickel-manganese-cobalt composite oxide, $Li_{1+0.15}[Ni_{0.425}Mn_{0.475}Co_{0.10}]O_2$ as a positive electrode active material. Using the produced laminate-type battery, the discharge characteristics in a low-temperature environment were evaluated by the same method as in Example 1.

Example 3

A metallic nickel powder as a nickel-containing raw material, trimanganese tetraoxide ($Mn_3O_4$) as a manganese-containing raw material, tricobalt tetraoxide ($Co_3O_4$) as a cobalt-containing raw material, tungsten trioxide ($WO_3$) as a tungsten-containing raw material, and lithium carbonate ($Li_2CO_3$) as a lithium-containing raw material were prepared. These raw materials were weighed to the following molar ratio: Li/(Ni+Mn+Co)=1.15, Ni:Mn:Co=0.35:0.45:0.20, (Ni+Mn+Co):W=1.0:0.01. The weighed raw materials were mixed in a ball mill using water as a solvent to give a slurry, followed by the production of a lithium-nickel-manganese-cobalt composite oxide containing tungsten by the same method as in Example.

A laminate-type battery was produced by the same method as in Example 1 using, as a positive electrode active material, the obtained lithium-nickel-manganese-cobalt composite oxide, $Li_{1+0.15}[Ni_{0.35}Mn_{0.45}Co_{0.20}]O_2$ containing tungsten. Using the produced laminate-type battery, the discharge characteristics in a low-temperature environment were evaluated by the same method as in Example 1.

Comparative Example 1

A lithium-nickel-manganese-cobalt composite oxide was produced by the same method as in Example 1. However, the raw materials were weighed to the following molar ratio: Li/(Ni+Mn+Co)=1.15, Ni:Mn:Co=0.40:0.40:0.20.

A laminate-type battery was produced by the same method as in Example 1 using the obtained lithium-nickel-manganese-cobalt composite oxide, $Li_{1+0.15}[Ni_{0.40}Mn_{0.40}Co_{0.20}]O_2$ as a positive electrode active material. Using the produced laminate-type battery, the discharge characteristics in a low-temperature environment were evaluated by the same method as in Example 1.

Comparative Example 2

A lithium-nickel-manganese-cobalt composite oxide was produced by the same method as in Example 1. However, the raw materials were weighed to the following molar ratio: Li/(Ni+Mn+Co)=1.05, Ni:Mn:Co=0.45:0.45:0.10.

A laminate-type battery was produced by the same method as in Example 1 using the obtained lithium-nickel-manganese-cobalt composite oxide, $Li_{1+0.05}[Ni_{0.45}Mn_{0.45}Co_{0.10}]O_2$ as a positive electrode active material. Using the produced laminate-type battery, the discharge characteristics in a low-temperature environment were evaluated by the same method as in Example 1.

Comparative Example 3

A lithium-nickel-manganese-cobalt composite oxide was produced by the same method as in Example 1. However, the raw materials were weighed to the following molar ratio: Li/(Ni+Mn+Co)=1.15, Ni:Mn:Co=0.45:0.45:0.10.

A laminate-type battery was produced by the same method as in Example 1 using the obtained lithium-nickel-manganese-cobalt composite oxide, $Li_{1+1.15}[Ni_{0.15}Mn_{0.15}Co_{0.10}]O_2$ as a positive electrode active material. Using the produced laminate-type battery, the discharge characteristics in a low-temperature environment were evaluated by the same method as in Example 1.

Comparative Example 4

A lithium-nickel-manganese-cobalt composite oxide was produced by the same method as in Example 1. However, the raw materials were weighed to the following molar ratio: Li/(Ni+Mn+Co)=1.15, Ni:Mn:Co=0.33:0.33:0.33.

A laminate-type battery was produced by the same method as in Example 1 using the obtained lithium-nickel-manganese-cobalt composite oxide, $Li_{1+0.15}[Ni_{0.33}Mn_{0.33}Co_{0.33}]O_2$ as a positive electrode active material. Using the produced laminate-type battery, the discharge characteristics in a low-temperature environment were evaluated by the same method as in Example 1.

Comparative Example 5

A lithium-nickel-manganese-cobalt composite oxide was produced by the same method as in Example 1. However, the raw materials were weighed to the following molar ratio: Li/(Ni+Mn+Co)=1.15, Ni:Mn:Co=0.30:0.40:0.30.

A laminate-type battery was produced by the same method as in Example 1 using the obtained lithium-nickel-manganese-cobalt composite oxide, $Li_{1+0.15}[Ni_{0.30}Mn_{0.40}Co_{0.30}]O_2$ as a positive electrode active material. Using the produced laminate-type battery, the discharge characteristics in a low-temperature environment were evaluated by the same method as in Example 1.

Comparative Example 6

A lithium-nickel-manganese-cobalt composite oxide was produced by the same method as in Example 1. However, the raw materials were weighed to the following molar ratio: Li/(Ni+Mn+Co)=1.15, Ni:Mn:Co=0.30:0.60:0.10. The obtained fired powder was subjected to powder X-ray diffraction analysis under the following analysis conditions. As a result, it was shown that a heterogeneous phase was present in addition to the lithium-nickel-manganese-cobalt composite oxide having a hexagonal, layered rock-salt type crystal structure belonging to the space group R3m.

(Discussion)

The lithium-nickel-manganese-cobalt composite oxides produced in Examples 1 to 3 and Comparative Examples 1 to 5 above were subjected to powder X-ray diffraction analysis under the following analysis conditions.

(Analyzer: XRD apparatus (RINT2500), Analysis Conditions: X-ray source: CuKα ray, 50 kV/250 mA, divergence slit: 0.5°, scattering slit: 1°, receiving slit: 0.15 mm, scanning rate: 1°/min, step width: 0.01°)

Table 1 shows the peak intensity ratio (A/B) of the diffraction peak intensity (A) observed near 2θ=18.6±0.2° to the diffraction peak intensity (B) observed near 2θ=44.3±1.0° calculated from the results of the powder X-ray diffraction analysis; the α, x, y, and z values of the preparation composition; and the ratio of the discharge capacity at 10 C to the discharge capacity at 1 C (discharge capacity retention) as results of the evaluation of battery characteristics in a low-temperature environment.

TABLE 1

| | Composition | | | | | XRD | Discharge Capacity |
|---|---|---|---|---|---|---|---|
| | α | x | y | z | x/y | Molar Ratio W/(Ni + Co + Mn) | A/B | Ratio 10 C/1 C |
| Example 1 | 0.15 | 0.35 | 0.45 | 0.20 | 0.78 | None | 0.96 | 55.6 |
| Example 2 | 0.15 | 0.425 | 0.475 | 0.10 | 0.89 | None | 0.96 | 50.1 |
| Example 3 | 0.15 | 0.35 | 0.45 | 0.2 | 0.78 | 1 | 0.93 | 57.3 |
| Comparative Example 1 | 0.15 | 0.40 | 0.40 | 0.20 | 1.00 | None | 1.12 | 45.1 |
| Comparative Example 2 | 0.05 | 0.45 | 0.45 | 0.10 | 1.00 | None | 0.94 | 28.3 |
| Comparative Example 3 | 0.15 | 0.45 | 0.45 | 0.10 | 1.00 | None | 0.98 | 33.9 |
| Comparative Example 4 | 0.15 | 0.33 | 0.33 | 0.33 | 1.00 | None | 1.20 | 33.8 |
| Comparative Example 5 | 0.15 | 0.30 | 0.40 | 0.30 | 0.75 | None | 1.10 | 47.2 |

The results in Table 1 show that in Examples 1 to 3, the electrode active materials of the present invention containing a lithium-nickel-manganese-cobalt composite oxide, which has a hexagonal, layered rock-salt type crystal structure that belongs to the space group R3m and whose diffraction peak intensity ratio is 0<A/B<1.0, exhibits excellent rate characteristics in a low-temperature environment. Incidentally, in the case of a lithium-nickel-manganese-cobalt composite oxide whose diffraction peak intensity ratio is A/B≥1.0, the crystals are fragile, resulting in poor rate characteristics in a low-temperature environment.

It should be understood that the embodiments and examples disclosed herein are intended to be illustrative in all respects, and not restrictive. The scope of the present invention is indicated by the claims rather than by the foregoing embodiments and examples, and encompasses all changes and modifications which come within the meaning and range of equivalency of the claims.

The electrode active material of the present invention contains a lithium-nickel-manganese-cobalt composite oxide having a hexagonal, layered rock-salt type crystal structure that belongs to the space group R3m and is capable of improving the rate characteristics of a nonaqueous electrolyte secondary battery in a low-temperature environment. Therefore, the electrode active material is useful for the production of a nonaqueous electrolyte secondary battery.

The invention claimed is:

1. An electrode active material comprising:
a lithium-nickel-manganese-cobalt composite oxide having a hexagonal, layered rock-salt type crystal structure that belongs to the space group R3m,
the lithium-nickel-manganese-cobalt composite oxide being represented by $Li_{1+\alpha}[Ni_xMn_yCo_z]O_2$ wherein α satisfies 0.1<α<0.3, and x, y, and z satisfy x+y+z=1, 0.075<z<0.250, and 0.50<x/y<0.90, and
wherein, in a powder X-ray diffraction analysis of a powder of the lithium-nickel-manganese-cobalt composite oxide using a CuKα ray, a peak intensity ratio (A/B) of a diffraction peak intensity (A) observed near 2θ=18.6±0.2° to a diffraction peak intensity (B) observed near 2θ=44.3±1.0° is more than 0 and less than 1.0.

2. The electrode active material according to claim 1, further comprising tungsten.

3. The electrode active material according to claim 2, wherein a molar ratio of tungsten content to a total content of nickel, manganese, and cobalt is 0.005 or more and 0.03 or less.

4. A nonaqueous electrolyte secondary battery comprising an electrode containing the electrode active material of claim 1.

5. A nonaqueous electrolyte secondary battery comprising an electrode containing the electrode active material of claim 2.

* * * * *